Dec. 18, 1956 C. K. BROBEIL 2,774,364
PROPORTIONING AND DISPENSING MEANS
Filed March 17, 1954 3 Sheets-Sheet 3

INVENTOR
*Carl K. Brobeil*

BY *Johnson and Kline*
ATTORNEYS

# United States Patent Office 2,774,364
Patented Dec. 18, 1956

2,774,364
PROPORTIONING AND DISPENSING MEANS

Carl K. Brobeil, Oxford, Conn.; Olga S. Brobeil, administratrix of said Carl K. Brobeil, deceased Application March 17, 1954, Serial No. 416,796

19 Claims. (Cl. 137—3)

The present invention relates to a novel method and system for measuring and dispensing liquid or the like fluid material, and more particularly to a measuring system having a simple and accurate volumetric control.

Heretofore, efforts have been made to measure and/or dispense liquids in required amounts; for example, in the supplying of proper ingredients for use in a Banbury mixer wherein predetermined amounts of accelerator, solvents, oils, plasticizers and the like are required for each mix in the mixer. However, the devices heretofore employed for this purpose have been complicated devices which are expensive to manufacture, install and operate and which are not capable of flexibility in their use.

The present invention overcomes the difficulties heretofore encountered by providing a measuring and dispensing system which is simple in construction and installation and which is easy to operate and is flexible in that one or more liquids can be measured and dispensed as required without substantial modification of the device.

This is accomplished by providing a plurality of independent sources of supply of the liquid or the like fluid material to be mixed and providing individual pumps for each supply to feed the liquid from the supply into a mixing chamber or vessel and controlling the pumps on the individual supplies in accordance with the volumetric measurement of the liquids in the chamber or vessel.

While the measuring means may take various forms, in the preferred form of the invention the vessel or chamber comprises a cylinder having a piston therein to be displaced by the volume of the fluid as it is fed therein by the individual pumps and in controlling the action of the pumps in accordance with the displacement of the piston. After the completion of the feeding of the liquids into the vessel, the piston is actuated to cause the mixed fluids to flow from the vessel to a mixer or other receiver for the liquid. Although the piston may be actuated in various ways, in the preferred form of the invention it is actuated by means of an air cylinder having a piston therein connected to the piston in the vessel to move the same.

A feature of the invention resides in the air purging of the line leading from the vessel to the receiver to insure a complete discharge of liquid into the receiver for each measuring and dispensing operation.

Another feature of the present invention resides in the simplicity and flexibility of the control for the motors for the various pumps whereby the amount of liquid fed by the pumps can be readily and easily controlled. Further, if desired, one or more of the pumps may be cut out of the operation by a simple adjustment of switches in the electrical circuit. The measuring and delivering cycle of the device may be fully automatic so as to go through a series of cycles as required or may be manually controlled, if desired.

Other features and advantages of the invention will be apparent from the specification and claims when considered in connection with the drawings in which:

While the device of the present invention may be employed to provide predetermined quantities of liquids for use in any type of mixing and/or dispensing operation, the illustrated form of the invention is arranged to supply a Banbury mixer (not shown) with the required oils or other liquids or chemicals necessary in the mixing process.

Figure 1:
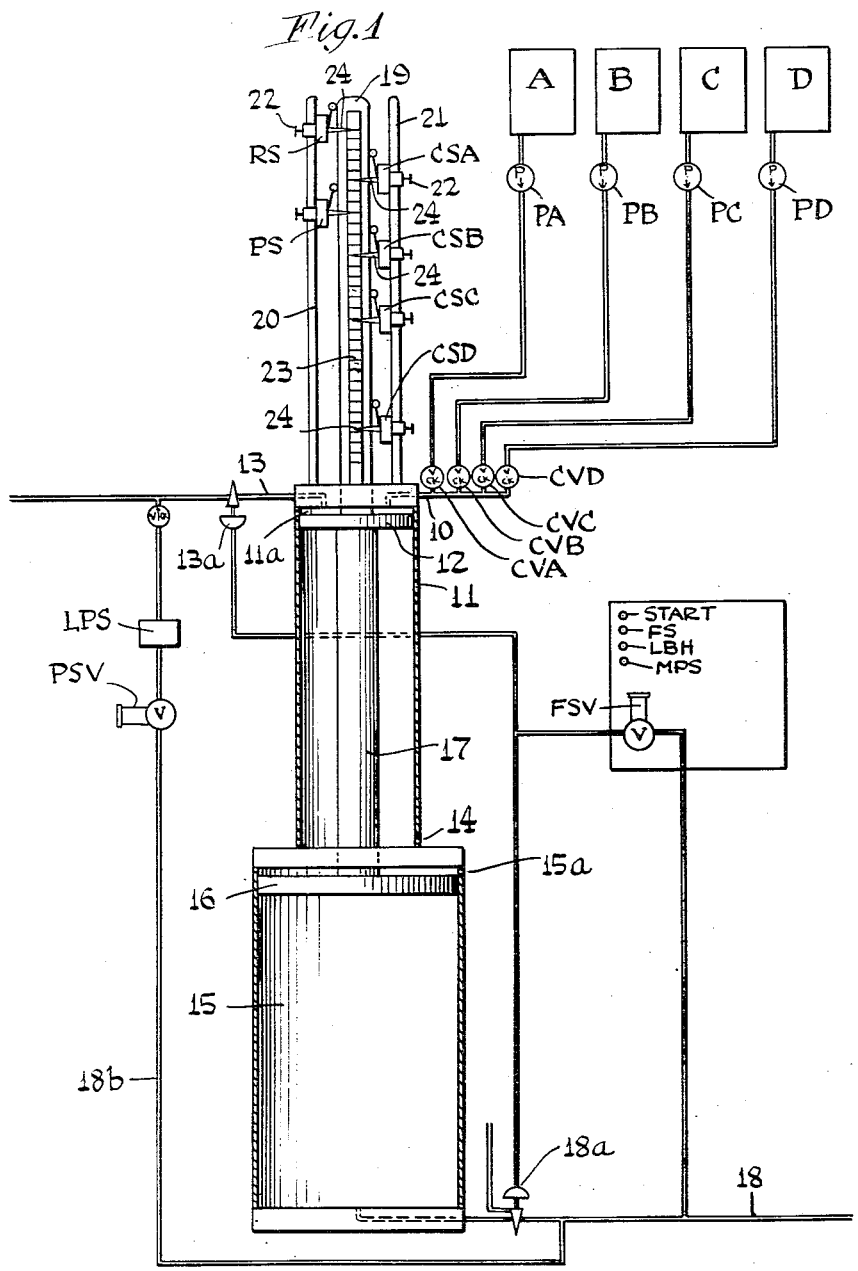
Figure 1 shows a diagrammatic view of the apparatus in position to start a measuring and feeding cycle.

As shown in Fig. 1, there are four supply stations A, B, C and D for the liquid. Each has connected thereto a pump PA, PB, PC and PD. These are connected to a common intake pipe 10 through check valves CVA, CVB, CVC and CVD. The common intake pipe leads into a mixing vessel, such as a cylinder 11. The mixing vessel has displaceable means movable in accordance with the volume of liquid fed into the vessel. While this may be a float or the like, it is herein illustrated as a piston 12 slidably mounted in the cylinder. The cylinder has an outlet 13 which leads to the Banbury mixer or other liquid-receiving apparatus and controlled by an air actuated valve 13a. It will be seen, therefore, that as the pumps are each operated they will force the required amount of liquid through its corresponding check valve and into the space 11a in the vessel above the piston and will displace the piston in accordance with the volume of liquid therein. The cylinder 11 may have a vent 14 therein to permit the piston to move down easily as the liquid is fed therein.

After the required amount of liquid is fed into the vessel and the piston 12 displaced thereby, the piston is reversed to force the liquid therefrom through the line 13 to the mixer. While this may be accomplished in any suitable way, it is at present preferred to provide an air cylinder 15 having a vent 15a and piston 16 therein connected by a piston rod 17 to the piston 12 so that as the piston 12 is displaced by the liquid it will also move the piston 16 down in the cylinder. When it is desired to dispense the fluid from the vessel, air cylinder 15 is energized from air supply line 18 through air control valve 18a, causing the piston 16 through its piston rod 17 to force the piston 12 upwardly in the vessel to expel the fluid therefrom to the mixer. The check valves in the supply circuits will prevent any feeding back of the fluid into the supply lines.

In the preferred form of the invention the control valve 13a in the line 13 and the air control valve in line 18 from the air supply to the air cylinder are actuated simultaneously.

Line 13 beyond valve 13a is also connected to the air supply through line 18b and controlled by a solenoid valve PSV so that all of the liquid in the line 13 will be purged from the line upon actuation of the valve PSV after the piston 12 has emptied the vessel 11. This insures complete delivery of all of the liquid to the mixer so that there will be no variation in the amount delivered as might be caused if liquid remained in the line. It also prevents contamination in the fed charge should a change in a formulation of the mixture be made.

If desired, means can be provided for shutting off the air as soon as the line is purged so as to prevent undue passage of air into the Banbury mixer or other device.

This is accomplished in the illustrated form of the invention, by locating a low pressure switch LPS in the air line 18b and connecting the switch in the circuit to solenoid valve PSV so as to close the valve upon a predetermined pressure drop in the purged line as would occur when the liquid passes out of the line.

A novel control system is provided, according to the present invention, for regulating the pumps in accordance with the displacement of the piston. This comprises an extension 19 on the piston forming an actuator for a plurality of control switches CSA, CSB, CSC, CSD, PS and RS. These switches may be of any construction but are herein illustrated as single or double contact limit switches. As shown in Fig. 1, these switches are mounted on posts 20, 21 extending above the vessel and are adjustable therealong and clamped in the required position, corresponding to the volumetric displacement in the cylinder, by any suitable means such as set screws 22. In order to facilitate this adjustment, the actuator 19 is provided with a scale 23 which, when in the starting position as shown in Fig. 1, will cooperate with pointers 24 on the control switches to indicate the proper location thereof.

Figure 2:
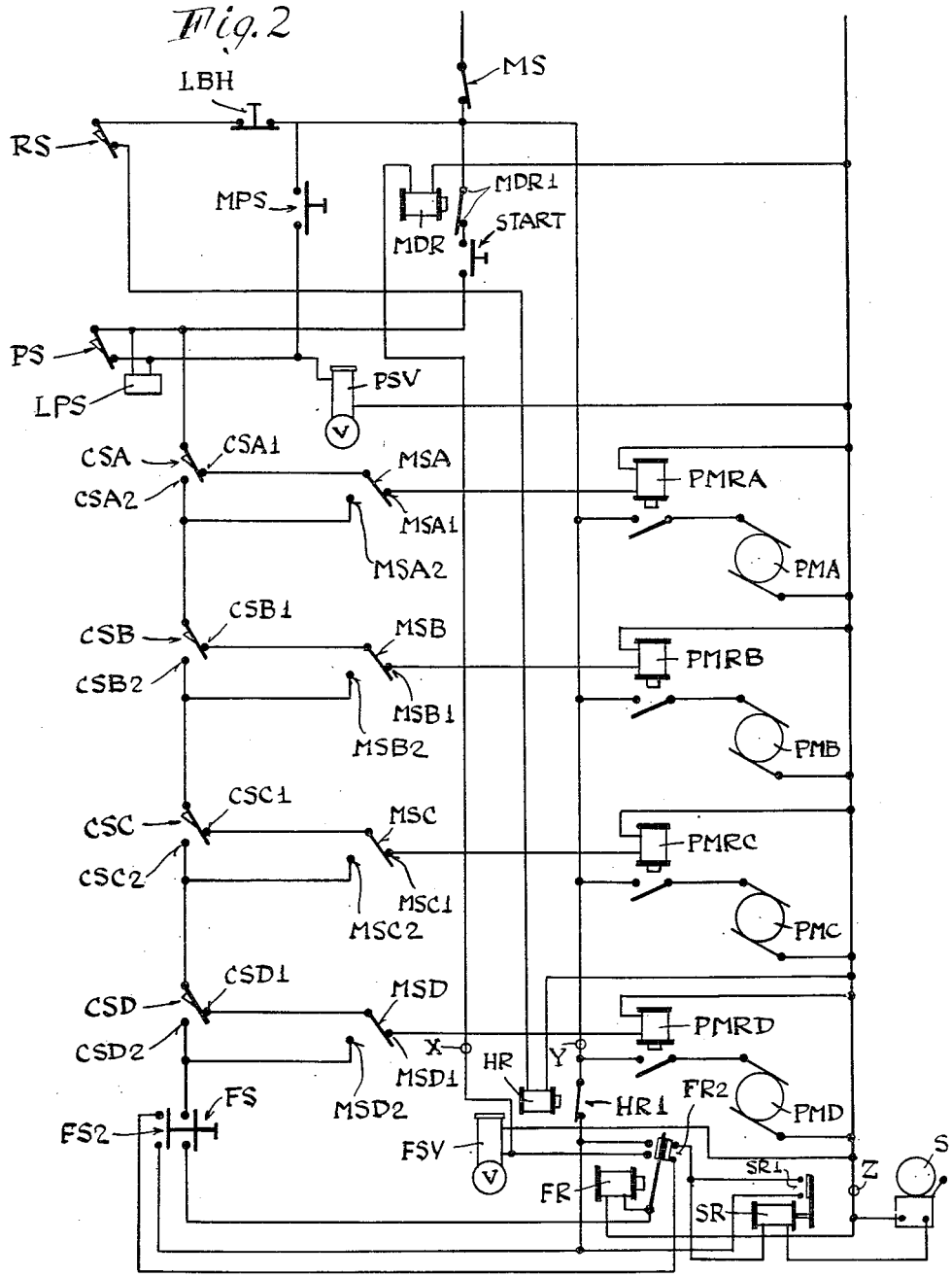
Fig. 2 shows a wiring diagram of the apparatus as shown in Fig. 1.

The switches are so arranged on the posts 20, 21 that their actuators will be engaged by the extension 19 in response to volumetric displacement of the piston and the circuit including the switches controlled thereby so as to accurately proportion the liquids fed to the mixer or other receiver. This probably will be best understood from the discussion of the control circuit for the pumps which is shown in Fig. 2. With the main switch MS closed, as shown therein, the device is ready for an operation. The actuator 19 being in its uppermost position, each of the switches RS, PS and control switches for the pumps CSA, CSB, CSC and CSD are moved to the position shown to start the cycle. The circuit from the switch MS extends through the normally closed contacts MDR1 of motor disconnect relay MDR to the Start switch. Upon movement of the Start switch to closed position, the circuit is completed through switch PS which actuates the purge solenoid valve PSV to purge the line 13 as described above. Also, it closes the circuit through control switch CSA, which has been moved to engage contact CSA1, to motor switch MSA which is in contact with MSA1 connected to the pump motor relay PMRA, the energization of the relay PMRA causing a normally open contact thereof to close and actuate motor PMA for the supply A. This will cause the pump for supply A to feed a predetermined amount of fluid into space 11a in the vessel and displace the piston until the actuator 19 has moved out of contact with switch CSA, whereupon the switch returns to normal position to engage contact CSA2 and the circuit is opened to MSA stopping pump PMA. Contact CSA2 is connected to switch CSB and through contact CSB1, switch MSB and contact MSB1 provides a circuit to energize relay PMRB closing the normally open circuit to the motor PMB to start the pump for supply B. This will feed liquid from supply B to displace the piston until the actuator 19 moves out of contact with CSB. Switch CSB moves to its normal position in engagement with CSB2 and opens the circuit at CSB1, stopping pump motor PMB. Contact CSB2 connects switch CSB to switch CSC. The circuit then extends through contact CSC1, motor switch MSC, contact MSC1 to pump motor relay PMRC. Energization of relay PMRC closes the normally open contacts thereof and starts the pump motor PMC to feed liquid from supply C until the piston is displaced the required amount, whereupon actuator 19 moves out of engagement with switch CSC. Switch CSC then moves to normal position in engagement with contact CSC2 and opens the circuit at CSC1 to stop the pump motor PMC. Contact CSC2 connects switch CSD in the circuit and through contact CSD1, switch MSD, contact MSD1 energizes pump motor relay PMRD to close the normally open circuit to the pump motor PMD to cause the liquid from supply D to be fed to the cylinder to displace it to the point wherein actuator 19 moves out of engagement with CSD. CSD then moves to normal position in engagement with contact CSD2 and opens the circuit through CSD1 to the pump motor relay, stopping the pump motor PMD and completes the feeding of the liquids into the vessel 11. Contact CSD2 connects the feed switch FS mounted on the panel to the power source so that it becomes operable to control the feeding of the liquid from the cylinder. It will be seen, therefore, that with the present circuit it is impossible to feed the liquid from the cylinder 11 until all of the pumps have been operated to supply the required liquid to the cylinder in proper proportions.

When it is desired to feed the mixed liquids from the vessel 11 to the receiver, feed switch FS is actuated which energizes feed relay FR, closing a holding circuit therefor through the contacts thereof and the normally closed contacts HR1 of holding relay HR and also completing a circuit through feed solenoid FSV which supplies actuating fluid to open the liquid control valve 13a and air control valve 18a so that air from the air supply 18 can feed into cylinder 15 and force the piston upwardly in the vessel 11 to feed the mixed liquids through line 13 to the mixer. The closing of feed relay FR completes the circuit through the motor disconnect relay MDR which opens the normally closed contacts MDR1 thereon so as to prevent operation of the pump motor relays and purge solenoid valve PSV by switches PS, CSA, CSB, CSC and CSD connected thereto as the actuator is moved to its uppermost position during the feeding of the liquid from the cylinder 11. When the actuator 19 reaches the top of its stroke, it closes recycling switch RS which closes the circuit to the hold relay HR. Energization of relay HR opens contact HR1 and breaks the holding circuit to relay FR and deenergizes the same. This opens the circuit to the solenoid valve FSV and causes the valves 13a and 18a to be closed and also opens the circuit to relay MDR which reestablishes the circuit to the control switches through the normally closed contact MDR1 for a new cycle.

As soon as the circuit through MDR1 is completed, the circuit including switch PS energizes the solenoid valve PSV to connect air to line 13 to purge the same and the circuit through CSA to the pump motor PMA is established to start the pump PA feeding liquid into the cylinder to move the piston down as described above. When the actuator moves out of engagement with switch PS the circuit will open and the solenoid valve will close off the air to the line.

If the device is to be stopped at the end of the cycle as when the last batch is being mixed, the normally closed switch LBH may be actuated to open the circuit, including switch RS which prevents operation of the recycling switch to open the hold circuit so that the control circuit will remain open at contacts MDR1.

In some installations it may be desirable to have a signal incorporated in the circuit to indicate failure of the feed relay to operate in response to actuation of the feed start button FS. This is accomplished, as shown in Fig. 2, by providing a signal circuit controlled by the feed relay FR and actuated by the feed switch FS. The circuit extends from the motor feed line through contacts FS2 of the feed start switch, normally closed contacts FR2 of the feed relay to signal relay SR to the signal S, herein illustrated as a bell. Thus, when feed switch FS is closed, the relay SR will be energized if feed relay FR does not operate in its normal manner and break the signal circuit at contacts FS2. A pair of holding contacts SR1 will close a holding circuit to the relay SR and maintain the signal operative until the improper operation of the circuit has been corrected.

Also, if it is desired to purge the line at any time, this is accomplished by actuating the manual purge switch MPS on the panel which immediately actuates valve PSV to force the liquid out of the line.

While switches FS and RSS may be automatically operated by a suitable cycling mechanism and by remote control if desired, they are herein illustrated as manually operated switches for purposes of simplicity.

If it is desired to feed from less than the four supply sources, this can be accomplished by merely properly positioning the motor switches MSA, MSB, MSC and MSD. For example, if it was desired to cut out supply A, motor switch MSA would be shifted from contact MSA1 to MSA2. This would prevent operation of relay PMRA and the pump motor PMA and connects the circuit to the next control switch CSB. Similarly, by selectively moving switches MSB, MSC, MSD to engage their No. 2 contacts the B, C and D supplies may be by-passed.

In some instances it may be desired to feed part of the proportioned mixture to a Banbury mixer or receiver at a predetermined time in the cycle and feed the balance of the proportioned mixture at a later time in the cycle.

Figure 3:
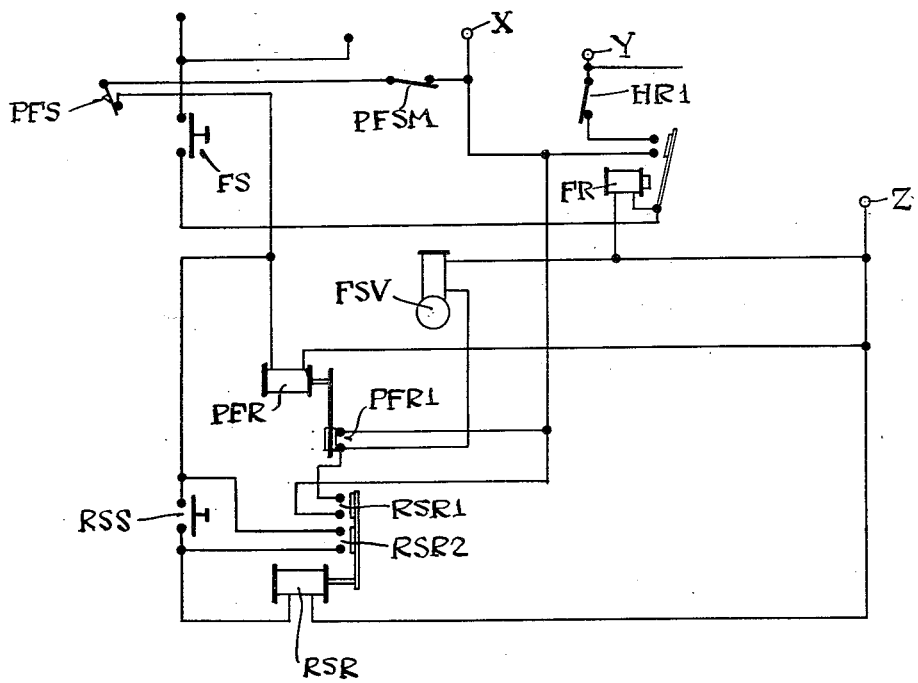
Fig. 3 shows a modification of the control circuit whereby partial dispensing of the proportioned fluid can be automatically accomplished.

This is accomplished by providing an automatic partial feed circuit. This circuit, as shown in Fig. 3, is adapted to be connected to the circuit of Fig. 2 at the points indicated by X, Y, Z and comprises a partial feed limit switch PFS adapted to be mounted on one of the posts above the cylinders with the other limit switches and adjusted on the post to a position whereby a predetermined volume of the liquid in the mixing cylinder will be fed before the switch actuator 19 engages the switch to close the circuit as shown. PFS is connected into the circuit of the motor disconnect relay at X and to the partial feed relay PFR.

The circuit to the feed solenoid valve FSV passes through the normally closed contacts PFR1 so that as soon as feed relay FR is energized, the solenoid valve FSV will be energized to start the feeding cycle and will move the piston until the piston has moved a predetermined amount whereby the partial feed switch PFS is closed as shown in Fig. 3, energizing the relay PFR to open the circuit contacts at PFR1 to the feed solenoid valve relay, whereupon the movement of the piston is stopped. When it is desired to feed the remaining liquid from the cylinder, restart switch RSS is closed energizing relay RSR. The energization of relay RSR will close a circuit to solenoid valve FSV through the contacts RSR1 and provide a holding circuit for relay RSR through RSR2 to maintain the relay RSR and solenoid valve operative until the circuit is broken at contact HR1 by engagement of the recycling switch RS by the actuator as described above.

If desired, a manual switch PFSM may be provided to open the circuit to the partial feed switch PFS so that the partial feed circuit can be cut out, if desired.

Thus it will be seen that the present invention provides a novel method and apparatus for accurately proportioning and dispensing liquids or the like fluid materials. Further, the apparatus can be manufactured at a relatively low cost, is simple to install and operate and has great flexibility of control whereby the proportions of the liquid fed to the vessel or cylinder can be readily regulated, and when discharged or dispensed from the cylinder to the mixer or receiver therefor can be accurately and completely discharged.

While the present invention is particularly applicable to supply liquid ingredients for use in conjunction with a Banbury mixer, it is to be understood that it may be employed in such other applications where it is desired to proportion and feed a plurality of liquids or fluid materials.

Variations and modifications may be made within the scope of the claims and portions of the improvements may be used without others.

I claim:

1. An apparatus for proportioning and dispensing fluid materials comprising a plurality of supply stations for the materials; feed means connected to each of the stations to feed material therefrom to a common vessel; means selectively controlling the starting and stopping of each of the feed means in accordance with the predetermined volume of material fed into the vessel; and emptying means feeding the mixed materials from the vessel to a receiver therefor.

2. An apparatus for proportioning and dispensing fluid materials comprising a plurality of supply stations for the materials; feed means connected to each of the stations to feed material therefrom to a common vessel; means selectively controlling the starting and stopping of each of the feed means in sequence in accordance with the predetermined volume of material fed thereby into the vessel; means feeding the mixed materials from the vessel through a line to a receiver therefor until the vessel is empty; and means purging the line to insure complete transfer of the mixed materials from the vessel to the receiver.

3. An apparatus for proportioning and dispensing fluid material comprising a plurality of supply stations for the materials; feed means connected to each of the stations to feed material therefrom to a common vessel; displaceable means in said vessel adapted to be displaced by the material fed into the vessel; means sequentially controlling the starting and stopping of each of the feed means in accordance with the predetermined displacement of said displaceable means; means emptying the materials from the vessel into a receiver; and means controlled by the displaceable means for preventing operation of the emptying means if the required displacement is not achieved.

4. An apparatus for proportioning and dispensing fluid materials comprising a plurality of supply stations for the materials; a pump connected to each of the stations; driving means for each of the pumps to feed the material from the supply to a cylinder having a piston therein; means controlling the drive for each of the pumps in accordance with the predetermined displacement of the piston by the material fed into the cylinder; and means actuating the piston to feed the materials from the cylinder to a receiver therefor.

5. An apparatus for proportioning and feeding fluids comprising a plurality of supply stations for the fluids; a pump connected to each of the stations; electrically operated driving means for each of the pumps to feed fluid from the supply to a cylinder having a piston therein to displace the piston in accordance with the volume of fluid fed into the cylinder by said pumps; switch means controlling the electrically operated driving means for each of the pumps; means connected to the piston to actuate said switch means incident to the movement of the piston by the fluid; and means moving the piston in the reverse direction to feed the fluids from the cylinder to a receiver therefor.

6. An apparatus for proportioning and dispensing fluid materials comprising a plurality of supply stations for the materials; a pump connected to each of the stations; electrically operated driving means for each of the pumps to feed material from the supply to a cylinder having a piston therein to displace the piston in accordance with the volume of material fed into the cylinder by said pumps; control means including switch means controlling the electrically operated driving means for each of the pumps to feed the material; means connected to the piston to actuate said switch means incident to the movement of the piston by the material; dispensing means moving the piston to feed the materials from the cylinder to a receiver therefor; and means rendering said control means inoperative during the dispensing movement of the piston.

7. An apparatus for proportioning and feeding liquids comprising a plurality of supply stations for the liquids; a pump connected to each of the stations; electrically operated driving means for each of the pumps to feed liquid from the supply to a cylinder having a piston therein to displace the piston in accordance with the volume of liquid fed into the cylinder by said pumps; switch means controlling the electrically operated driving means for each of the pumps; means connected to the piston to actuate said switch means incident to the movement of the piston by the liquid; dispensing means moving the piston to feed the liquids from the cylinder to a receiver therefor; and means rendered operative only after completion of the movement of the piston by the liquid for actuating the dispensing means.

8. An apparatus for proportioning and dispensing liquids comprising a plurality of supply stations for the liquids; a pump connected to each of the stations; electrically operated driving means for each of the pumps to feed liquid from the supply to a cylinder having a piston therein to displace the piston in accordance with the volume of liquid fed into the cylinder by said pumps, said piston having a switch actuator connected thereto for movement thereby; a plurality of switches controlling the electrically operated driving means for each of the pumps and being adjustably located in the path of movement of said switch actuator to be serially operated thereby incident to the movement of the piston by the liquid; means moving the piston in the opposite direction to empty the liquids from the cylinder to a receiver therefor; and means rendering said plurality of switches inoperative during the last-named movement of the piston.

9. An apparatus for proportioning and dispensing fluids comprising a plurality of supply stations for the fluids; a pump connected to each of the stations; electrically operated driving means for each of the pumps to feed fluid from the supply to a cylinder having a piston therein to displace the piston in accordance with the volume of fluid fed into the cylinder by said pumps, said piston having a switch actuator connected thereto for movement thereby; a plurality of switches controlling the electrically operated driving means for each of the pumps and being adjustably located in the path of movement of said switch actuator to be serially operated thereby incident to the movement of the piston by the fluid; means moving the piston in the opposite direction to empty the fluids from the cylinder to a receiver therefor; means rendering said plurality of switches inoperative during the last-named movement of the piston; and means actuated at the end of the emptying stroke of the piston for rendering the last-named piston moving means inoperative.

10. An apparatus for proportioning and dispensing fluid materials comprising a plurality of supply stations for the materials; a pump connected to each of the stations; electrically operated driving means for each of the pumps to feed material from the supply to a cylinder having a piston therein to displace the piston in accordance with the volume of material fed into the cylinder by said pumps, said piston having a switch actuator connected thereto for movement thereby; a plurality of switches controlling the electrically operated driving means for each of the pumps and being adjustably located in the path of movement of said switch actuator to be serially operated thereby incident to the movement of the piston by the material; dispensing means moving the piston in the opposite direction to empty the materials from the cylinder to a receiver therefor comprising a second cylinder having a piston therein and means connecting the two pistons; means supplying actuating material to said second cylinder; and means operated simultaneously with the last-named means to render said switches and the pumps controlled thereby inoperative during the dispensing cycle.

11. An apparatus for proportioning and feeding fluid material comprising a plurality of supply stations for the materials; a pump connected to each of the stations; electrically operated driving means for each of the pumps to feed material from the supply to a vessel comprising a cylinder having a piston therein to be displaced in accordance with the volume of material fed into the cylinder by said pumps; a control switch operator means actuated in response to movement of the piston; a control circuit having a circuit for each of the drive means for the pumps including a control switch adapted to be operated by the switch operator means, said switch operator means actuating the control switches serially to open the circuit to one pump and close the circuit to the control switch for the next pump in response to the movement of the piston by the material; and dispensing means including an operating electrical circuit therefor connected to the control switch for the last pump and closed thereby when the said control switch opens the last pump drive circuit upon completion of the movement of the piston by the material, said dispensing means reversing the movement of the piston so as to discharge the materials from the cylinder through a passage to a receiver therefor.

12. The invention as defined in claim 11 wherein selector switch means is provided in the circuit for each drive means whereby the pump can be cut out of the circuit and the circuit connected to the next pump circuit.

13. The invention as defined in claim 11 wherein there is provided means in the dispensing circuit actuated in response to the operation of the circuit for opening the control circuit including the plurality of control switches whereby the operation of the pumps is prevented during the reverse movement of the piston during the dispensing operation thereof.

14. The invention as defined in claim 11 wherein recycling switch means is connected in the dispensing circuit and is located to be engaged by the switch operator means at the end of the dispensing circuit to open said circuit and deenergize the dispensing means.

15. The invention as defined in claim 11 wherein a solenoid valve controlled air supply is connected to said passage and a switch means is connected in the valve circuit and actuated after the completion of the dispensing cycle to cause air to enter the passage and purge the same of any material therein.

16. In the method of predeterminately proportioning and dispensing liquids from a plurality of supply stations by means of pumps connected to each of the stations for feeding the liquid to a vessel to be dispensed therefrom, the steps of proportioning the liquid by controlling the pumps in seriatim in accordance with the volume of liquid fed thereby into the vessel; and dispensing the proportioned liquids from the vessel only after completion of the proportioning cycle by the feeding of the liquid to the vessel by the last pump.

17. In the method of predeterminately proportioning and dispensing liquids from a plurality of supply stations by means of pumps connected to each of the stations for feeding the liquid to a vessel having a displaceable means therein, the steps of proportioning the liquid by controlling the pumps in seriatim in accordance with the displacement of the displaceable means by the volume of liquid fed into the vessel; dispensing the proportioned liquids from the vessel only after completion of the proportioning cycle by the feeding of the liquid to the vessel by the last pump; and rendering the control of the pumps inoperative during the dispensing cycle.

18. In the method of predeterminately proportioning and completely dispensing liquids from a plurality of supply stations by means of pumps connected to each of the stations for feeding the liquid to a vessel to be dispensed therefrom, the steps of proportioning the liquid by controlling the pumps in seriatim in accordance with the volume of liquid fed thereby into the vessel; rendering the operating means for dispensing the liquids from the vessel operative after the pumps have completed the feeding of the liquids to the vessel; actuating the dispensing means to discharge the liquids from the vessel through a line to a receiver; simultaneously rendering the pumps inoperative to feed liquids during the dispensing cycle; and thereafter purging said line to complete the transfer of the liquids from the vessel to the receiver.

19. The invention as defined in claim 11 wherein the operating electrical circuit for the dispensing means includes means for stopping the dispensing means after a predetermined movement of the piston to partially feed the material therefrom and restart means for completing the dispensing cycle to feed the remaining material from the cylinder.

References Cited in the file of this patent

UNITED STATES PATENTS

| | | |
|---|---|---|
| 2,113,490 | Newbery | Apr. 5, 1938 |
| 2,389,412 | Carlton | Nov. 20, 1945 |
| 2,389,413 | Carlton | Nov. 20, 1945 |
| 2,413,029 | McFarland | Dec. 24, 1946 |
| 2,486,256 | Buck | Oct. 25, 1949 |
| 2,550,942 | Spangler | May 1, 1951 |